United States Patent
Righolt et al.

(10) Patent No.: US 11,747,309 B2
(45) Date of Patent: Sep. 5, 2023

(54) METHOD, SYSTEM AND TOOL FOR DETERMINING A WALL THICKNESS OF AN OBJECT

(71) Applicant: Röntgen Technische Dienst B.V., Rotterdam (NL)

(72) Inventors: Bernhard Willem Righolt, Barendrecht (NL); Sjors van Noort, Rotterdam (NL)

(73) Assignee: Rontgen Technische Dienst B.V., Rotterdam (NL)

( * ) Notice: Subject to any disclaimer, the term of this patent is extended or adjusted under 35 U.S.C. 154(b) by 1009 days.

(21) Appl. No.: 16/336,039

(22) PCT Filed: Sep. 26, 2017

(86) PCT No.: PCT/NL2017/050642
§ 371 (c)(1),
(2) Date: Apr. 11, 2019

(87) PCT Pub. No.: WO2018/056827
PCT Pub. Date: Mar. 29, 2018

(65) Prior Publication Data
US 2021/0349059 A1    Nov. 11, 2021

(30) Foreign Application Priority Data
Sep. 26, 2016   (NL) ..................... 2017536

(51) Int. Cl.
*G01N 29/48* (2006.01)
*G01B 17/02* (2006.01)
(Continued)

(52) U.S. Cl.
CPC ............. *G01N 29/48* (2013.01); *G01B 17/02* (2013.01); *G01N 29/0645* (2013.01);
(Continued)

(58) Field of Classification Search
CPC .... G01N 29/11; G01N 29/48; G01N 29/0645; G01N 29/265
See application file for complete search history.

(56) References Cited

U.S. PATENT DOCUMENTS 4,893,286 A * 1/1990 Cobb ...................... G01S 15/88
73/598
4,945,775 A * 8/1990 Adams ...................... F16L 55/26
73/865.8
(Continued)

FOREIGN PATENT DOCUMENTS

DE         4040190 A1      6/1992
DE    102008016032 A1    10/2009
(Continued)

OTHER PUBLICATIONS

European Patent Office, International Search Report in corresponding International Application No. PCT/NL2017/050642, dated Nov. 22, 2017 (2 pages).

*Primary Examiner* — Helen C Kwok
(74) *Attorney, Agent, or Firm* — Leydig, Voit & Mayer, Ltd.

(57) ABSTRACT

A method and system are described for determining a wall thickness of an object such as a pipeline using ultrasound. A pig is used that includes at least one first ultrasonic transducer that is attached to the pig for transmitting ultrasound in the object. Using at least one second ultrasonic transducer, a receiving signal is generated representing reflections of the ultrasound on the object received by the at least one second transducer. The received signals are processed by a processor provided at the pig to obtain a compressed receiving signal. In use, the processor determines a maximal N peaks having largest amplitudes and associated information on a moment on which each one of the maximal N peaks occurs within the receiving signal. Information about the maximal (Continued)

N peaks and associated information on the moment on which the maximal N peaks occurs is stored as the compressed receiving signal in a storing device of the pig.

37 Claims, 4 Drawing Sheets

(51) Int. Cl.
  *G01N 29/06* (2006.01)
  *G01N 29/265* (2006.01)
  *G01N 29/11* (2006.01)
(52) U.S. Cl.
  CPC .......... *G01N 29/11* (2013.01); *G01N 29/265* (2013.01); *G01N 2291/02854* (2013.01); *G01N 2291/044* (2013.01); *G01N 2291/2636* (2013.01)

(56) References Cited

U.S. PATENT DOCUMENTS

| | | | | |
|---|---|---|---|---|
| 5,460,046 A * | 10/1995 | Maltby | .................. | G01N 29/09 73/628 |
| 5,497,661 A * | 3/1996 | Stripf | .................... | G01N 29/38 73/616 |
| 5,587,534 A * | 12/1996 | McColskey | ............ | G01B 17/02 73/598 |
| 5,628,319 A * | 5/1997 | Koch | ..................... | G01N 29/48 600/437 |
| 5,648,613 A * | 7/1997 | Kiefer | .................... | G01N 29/40 73/609 |
| 6,571,634 B1 * | 6/2003 | Bazarov | ................. | G01N 29/48 73/623 |
| 8,884,793 B2 * | 11/2014 | Gemmeke | .............. | G01N 29/44 702/171 |
| 2003/0083576 A1 * | 5/2003 | Bazarov | ............... | G01N 29/265 600/437 |
| 2004/0261547 A1 * | 12/2004 | Russell | ................ | G01N 29/045 73/865.8 |
| 2009/0084184 A1 * | 4/2009 | Dijkstra | ............... | G01N 29/265 73/623 |
| 2011/0067497 A1 * | 3/2011 | Grubb | .................. | G01N 29/223 73/623 |
| 2013/0314260 A1 * | 11/2013 | Gemmeke | ............... | H03M 7/60 341/87 |
| 2014/0238136 A1 * | 8/2014 | Ten Grotenhuis | ........................... | G01N 29/0654 73/592 |
| 2017/0058660 A1 * | 3/2017 | Hunter | .................. | E21B 47/005 |
| 2017/0153108 A1 * | 6/2017 | Kitazawa | ............. | G01N 29/348 |

FOREIGN PATENT DOCUMENTS

| | | |
|---|---|---|
| DE | 102012025535 A1 | 6/2014 |
| NL | 2017536 B1 | 4/2018 |
| WO | WO 2018-056827 A1 | 3/2018 |

* cited by examiner

METHOD, SYSTEM AND TOOL FOR DETERMINING A WALL THICKNESS OF AN OBJECT

CROSS-REFERENCE TO RELATED APPLICATIONS

This patent application is a U.S. National Phase of PCT International Application No. PCT/NL2017/050642, filed Sep. 26, 2017, which claims priority to Netherlands Application No. 2017536, filed Sep. 26, 2016, which are both expressly incorporated by reference in their entireties, including any references contained therein.

THE INVENTION FIELD OF THE INVENTION

The invention relates to a method, a system and a tool for determining a wall thickness of an object using ultrasound.

BACKGROUND TO THE INVENTION

The inspection of pipelines or similar objects can be complex and expensive since narrow pipe diameters can make it impossible for a person to do an internal inspection of it. Furthermore, it is desirable to minimally affect the pipeline operation while performing an inspection. An ultrasonic wall thickness measurement can be carried out for a variety of objects. Such a measurement is commonly carried out for determining a wall thickness of a pipeline, or a similar object, filled with a fluid such as water or oil. A liquid enables the ultrasonic measurement, as the ultrasonic waves emitted by an ultrasonic transducer or probe can travel through the liquid to the pipe wall and reflect back.

Typically, for wall thickness measurements an ultrasound time signal (known as A-scan) is evaluated, wherein for instance the peaks or flanks of the interface signals are determined. By multiplication of the time difference between interface signals with sound velocity, the wall thickness can be determined.

Measuring the wall thickness along a length direction of a pipeline can identify different structural anomalies along the pipeline. Also pipeline features like welds, bends and take-offs can be identified by evaluation of the ultrasound time signals.

Such time signals of ultrasonic measurements (i.e. signal amplitude versus time) can for instance be carried out using an in-line inspection (ILI) tool, which may be an untethered tool with no communication connection to the outside world. In such a case, the measurement data needs to be stored in the tool itself, such that it may be accessed later on. However, since the measurements may be carried out in high resolution and/or for a complete length and circumference of a pipeline being examined, this may result in a large quantity of data obtained from a large number of measurement points.

One of the shortcomings may be that the data storage capacity of the tool is limited, so that it is not possible to store the original measurement data comprising original or measured ultrasonic time signals. For this purpose, a compression may be employed for reducing the total amount of data stored inside the tool.

In many cases, employing a lossless compression technique does not sufficiently reduce the quantity of data to solve this problem. Furthermore a lossless compression includes all the original measurement data when decompressed, which may make proper analysis of the data by a human expert such as an ultrasonist more difficult.

Therefore, lossy compression techniques are utilized to improve the data reduction for enabling successful storage of the measured data. However, lossy compression techniques, while being able to improve the compression rates and therefore reduce the required data sizes for storage (e.g. file sizes on a storage unit), may permit reconstruction of only an approximation of the original data.

Valuable data and thus potentially the accuracy for determining the wall thickness of the object can therefore be detrimentally influenced as a result of such a lossy compression. This may result in errors or inaccuracies in the process of linking portions of the received signal with certain events resulting from the reflection of the ultrasound from the pipe walls, such as an inner diameter (ID) echo, outer diameter (OD) echo, etc.

Thus it follows that an event is the at least one reflection (echo) of the ultrasound transmitted in the object wherefrom the wall thickness has to be determined, such as a reflection on an inner diameter (ID; inner surface) of the object or a reflection on an outer diameter (OD; outer surface) of the object.

In existing tools a threshold or "peak-picker" is employed so as to detect relevant signals within the receiving signal. Typically, only the position of the internal surface ID echo and external surface OD echo are determined and stored, optionally with the maximum amplitude of these echoes. Although this may result in strong reduction of data, it is not possible to reconstruct the original signals from this limited information (ID position, OD position, ID amplitude, OD amplitude) or to verify whether the selected positions are reliable and correct. For example, in some situations, for instance in case of a local wall thickness variation or a contaminated surface, interface signals may be disturbed (typically weakened).

Also, if just one of the required interface signals (internal surface ID or external surface OD) is missing or low in amplitude, this may prevent the calculation of a thickness.

Moreover, the quality of the evaluation cannot be checked afterwards if the original ultrasound time signal (A-scan) is not stored, wherein the storage of all ultrasound time signals typically requires a large data storage capacity which may not be feasible for non-tethered tools.

SUMMARY OF THE INVENTION

It is an objective of the invention to obviate or alleviate at least one of the above mentioned drawbacks.

It is an objective to employ data compression for ultrasonic wall thickness measurement from which sufficient relevant information can be retrieved.

It is a further objective to provide a method for automatization of the evaluation process of the compressed measurement data.

Thereto, according to an aspect is provided a method for determining a wall thickness by means of ultrasound upon use of a pig wherein by means of at least one first ultrasonic transducer which is attached to the pig ultrasound is transmitted in an object wherefrom the wall thickness has to be determined. By means of at least one second ultrasonic transducer, a receiving signal is generated representing reflections of the ultrasound on the object received by the at least one second transducer. The received signals are processed by means of a processor provided at the pig to obtain a compressed receiving signal. The compressed receiving signal is stored in a storing device provided at the pig. In use, the processor determines in the signal maximal N peaks having the largest amplitudes and associated information on the moment on which these peaks occur within the receiving signal. Information about the maximal N peaks and associated information on the moment on which these peaks occur is stored in the storing device. Thus it follows that N is a predetermined number.

In case of a pipeline wall inspection, acoustic pulses generated by the at least one first ultrasonic transducer reflects on the inner walls of the pipe and are received as echo signals by the at least one second transducer. The time of arrival of the ultrasound echoes can be registered by the at least one second transducer. It is possible to determine the distance between the at least one first transducer, the wall and the at least one second transducer by measuring the time between the transmission and reception of the echo and knowing the propagation speed of the ultrasound wave in the medium. By determining these distances along the pipe, for example a profile can be reconstructed and it is possible to estimate a level of corrosion. Moreover, it is possible to measure the wall thickness by taking the time difference between the first and second echoes. A pig (Pipeline Inspection Gauge) is arranged for being inserted in a pipeline. Typically, a pig comprises a plurality of ultrasonic transducers. However, other sensors may optionally also be arranged, such as magnetic, tactile, etc. so as to determine a wall thickness, inspection of the pipe, treatment of the pipe, assess the level of corrosion, investigate metal loss of the pipes, etc.

The compression of the receiving signal to the compressed receiving signal may be advantageous when the pig is untethered during use when the measurements are carried out. In this case, measurement points may have to be stored in the untethered pig and/or analyzed within the untethered pig. By employing compression and using the compressed receiving signal, the amount of data to be stored can be reduced while still being capable of reconstructing a full A-scan (full receiving signal), or at least have the relevant information available, instead of for example only 1 peak per interface. More than one peak per interface can be selected in the compressed receiving signal.

The use of maximal N peaks in the compressed receiving signal may thus provide an alternative for storing all original A-scans, reducing the storage requirements for saving all the data. Advantageously, next to the data reduction, all relevant information can be stored for evaluation and verification purposes, making the measurement process more robust.

The compressed receiving signal may provide the possibility to construct additional visualizations or displays. Since the compressed receiving signal contains the relevant information comprising more than one peak per interface, it can be used for several display formats that are already used for original A-scan data. This may provide more information to an operator while the interpretation is similar to existing displays. The shape of interface signals may be displayed as several peaks grouped in a distinctive pattern, such that an automated event-picking can be made more robust and/or allow the operator to verify the picked events. For example, in case of difficult situations where the receiving signal is less strong or clear, e.g. at the edge of corrosion, poor signal-to-noise ratio, etc., this may provide more options for a better evaluation the measurement results.

Optionally, the peaks having positive and negative amplitudes are taken into account for determining the maximal N peaks in the compressed receiving signal.

The method thus involves both storing positive and negative peaks, so no signal rectification is necessary. Typically, a part of the available information is lost as a result of signal rectification. By using both positive and negative peaks, the reconstruction of the original signal from the compressed receiving signal can be improved.

Optionally, N is in the range between 10 to 100. If the value of N, which can be a positive integer number, is too low, this may detrimentally influence the accuracy of the determination of the wall thickness. If the value of N is too high this may detrimentally influence the maximum amount of measurement points to be stored.

Optionally, N is one of the group of 16, 32, 64, 128, preferably between 16 and 64, and more preferably 32. A maximum of approximately 32 peaks may provide satisfying compressed receiving signals in some embodiments. However, the value of N may depend also on other parameters. In an example, compression of the receiving signal is performed using different N values, wherein the results for the different N values are compared with respect to each other so as to determining the most satisfying N value for the particular situation. This process can be performed automatically.

Optionally, the maximal N peaks are stored if the amplitude of each of the N largest peaks is larger than a first threshold value and wherein M<N peaks are stored if the signal only comprises M largest peaks having an amplitude which is larger than the first threshold. A maximum of N peaks with maximum amplitude are stored for each receiving signal (e.g. A-scan), provided that the peak is larger than a threshold amplitude value. In this way, depending on the receiving signal obtained by means of the at least one second transducer, up to N peaks can be stored by the pig. The maximum of N peaks is preferably chosen such that sufficient relevant information can be retrieved from the compressed receiving signal. A compressed receiving signal (i.e. compressed A-scan) comprises a maximum of N index-amplitude pairs of the highest amplitudes of the recorded receiving signal (i.e. recorded A-scan) for each measurement. The index-amplitude pairs form a peak in the compressed receiving signal. An inner diameter (ID) and outer diameter (OD) reflection can be determined from the compressed receiving signal.

Optionally, more than one peak per interface is stored. In this way, more than one index-amplitude pairs or peaks per interface are available, which data may be relevant for evaluation and verification of the compressed receiving signal. Multiple wall thickness interface signals, corresponding to a first or multiple reflections on the OD surface, can be stored and evaluated, if available.

Optionally, the first and second ultrasonic transducers are the same. Acoustic pulses or signals generated by the at least one first ultrasonic transducer may reflect on the inner and outer walls of the pipeline and can be received as echo signals by the at least one second transducer. When the first and second ultrasonic transducer is the same, the total number of transducers arranged in a pig can be reduced. This may result in more available space for other transducers.

Optionally, the pig comprises a plurality of first and/or second transducers. Potentially, the accuracy and/or resolution of the ultrasonic measurements can be improved by arranging more ultrasonic transducers in the pig.

Optionally, the pig is moved axially inside a pipe filled with a fluid for measuring the wall thickness along the pipe circumference over a first length of the pipe, wherein the measured wall thickness is the wall thickness of the pipe, wherein a plurality of measurements are carried out within the first length of the pipe. The pig may be arranged such that every distance travelled in the pipeline within the first length of the pipe an ultrasonic measurement is carried out by means of the first and second ultrasonic transducers, which may be the same. A plurality of transducers may be arranged along a circumference of the pig so that an ultrasound measurement is carried out over an entire circumference of the pipe. The ultrasound measurement can be carried out while the pig moves in a length direction of the pipeline. The importance of the data compression may become stronger when more ultrasound transducers are employed, since more data is generated by the second ultrasonic transducers.

Optionally, an automatic event-picking is performed to determine time positions of different signals of object wall interfaces, i.e. inner diameter and outer diameter. Thus it follows that an event is the at least one reflection (echo) of the ultrasound transmitted in the object wherefrom the wall thickness has to be determined, such as a reflection on an inner diameter (ID; inner surface) of the object or a reflection on an outer diameter (OD; outer surface) of the object.

An interpretation of measurement results comprising the receiving signal by an operator or human expert such as an ultrasonist can be very labor intensive or may be economically not feasible, especially due to the typically large number of measurements. The large number of measurements or measurement points can be a result of the use of a plurality of measurement probes or transducers arranged on a pig, a high coverage along a pipe circumference and length, high accuracy and reliability for thickness measurement especially at weak or disturbed signals, etc. An automatic event-picking performed on the compressed receiving signal is able to perform the event-picking process much faster than an ultrasonist. Consequently, an automatic evaluation for event-picking based on the compressed receiving signal (i.e. compressed A-scan) can be advantageous. The efficiency can be improved and moreover the risk of human error can be avoided.

By means of an automatic event-picking, the wall thickness of the object or pipeline can be determined. Furthermore, an automatic event-picker can also be controlled and adjusted by an expert, wherein the presented analysis to the expert may improve the derived information from a compressed A-scan.

It may be required, afterwards, to be able to check if relevant information is available for the evaluation of the measurement data, and if the automated evaluation by means of automatic event-picking has selected correct event signals. By using the compressed receiving signal, the amount of data to be stored can be reduced while still being able of reconstructing a full A-scan (i.e. receiving signal), or at least have relevant information available in the form of more than one peak per interface.

Automatic event-picking based on the compressed receiving signal or compressed A-scan may thus be an alternative for storing all original A-scans during the measurement. Furthermore, instead of using event-picking resulting in only a single peak per interface, such as simply selecting the maximum amplitude per interface echo or correlating the emitted pulse shape with the interface signals, a plurality of peaks per interface are obtained, wherein the total number of peaks is up to N. Advantageously, event-picking in compressed receiving signal, such as compressed A-scan data, can be performed without reconstruction and decompression. The results of an event-picking can be presented to an operator for verification, for example by displaying the compressed A-scan. Events can be marked in a compressed A-scan.

Optionally, the automatic event-picking comprises: picking of a stand-off (SO), wherein an event is searched which corresponds to the nearest wall; determining an event center of remaining events; and picking of a wall thickness (WT). Typically, the peak with the highest amplitude corresponds to the SO echo event. Optionally, the maximum peak can be picked and the corresponding index can be linked to the SO. If there is only one peak or index-amplitude pair, this may be marked as SO, so that only the precise value of SO needs to be determined.

For the WT determination it may not be required to explicitly pick a specific event, but rather a combination of multiple events can be used. For this purpose, the centers of these events may need to be determined, before calculating the WT. The shape of a previously determined SO pulse can be used, and an approximate correlation function can be applied.

Optionally, a pre-processing of a compressed receiving signal is performed prior to picking of the stand-off (SO). During a pre-processing the compressed receiving signal (or compressed A-scan) can be prepared for event-picking. Pre-processing may for instance include rearranging data points so as to improve the efficiency of event-picking. Also, pre-processing may for instance include determining and using the wall thickness of neighboring pixels so as to improve the event-picking and/or the process of picking SO and WT in the automatic event-picking process. The WT of neighboring pixels can be calculated in various ways, for example, an average WT of all transducers in the previous scan can be used. Pixels where no WT was picked can be discarded so that in the first few scans this value can still be non-existent.

Additionally or alternatively, some parts of a compressed A-scan can be dismissed. For example if less than N compressed A-scan peaks exceed the threshold, zeros may be present in the compressed A-scan. Therefore, advantageously, the zeros may be excluded for event-picking.

Optionally, during pre-processing the selected peaks of the compressed receiving signal are ordered in a time of flight index sequence. A raw compressed A-scan may be stored in order of decreasing amplitude, for example because the peaks with highest amplitudes are selected. However, a time of flight (or index) ordered list may be advantageous during event-picking, requiring a reordering of the selected peaks. For example, a raw compressed A-scan may identify and select 32 (or less) peaks, if N is equal to 32. Such a list of 32 (or less) peaks is arranged in an order from a maximum amplitude to a minimum amplitude. However, for event-picking preferably the list is rearranged in a time order, which can be more convenient for sorting during event-picking and/or more optimized for speed (efficiency) of the event-picking. After rearranging, thus a collection of N=32 or less peaks or index amplitude pairs, sorted by index, can be obtained.

Optionally, during pre-processing the peaks are grouped in an event group, wherein peaks are grouped belonging to a same event group when consecutive indices of the index sequence are located close to each other. This may be seen as an event numbering, wherein an event number is assigned to peaks or index-amplitude pairs associated with a signal of one of the surfaces of the pipeline, e.g. inner diameter or outer diameter. Peaks with a same event number (i.e. group) belong to a same event.

Optionally, peaks are grouped belonging to a same event group when consecutive indices of the index sequence are separated by less than approximately three quarter of a wavelength, wherein the wavelength is used to describe the distance along the time axis for one full cycle in the signal. Approximately less than three quarter of a wavelength of the emitted ultrasound can be chosen because a positive and a negative peak may be separated by half of a wavelength. A margin can be employed.

Optionally, picking of the stand-off includes: determining a candidate SO event as the event having the peak with the highest amplitude in the compressed receiving signal; selecting the candidate SO event as the SO event if the peak with the highest amplitude belongs to the first event group; or selecting an earlier event with the maximum amplitude before the candidate SO event as the SO event if it has an amplitude of more than 30%-50% of the candidate SO event amplitude and if the distance between the candidate SO event and the earlier event is approximately equal to the neighboring WT. A rough surface can have an influence on the measured amplitude. Typically, the peak with the highest amplitude belongs to the first event group if the first surface (inner diameter) is undamaged (as there is no corrosion). However, if corrosion is present at the inner diameter, local variations in the position can be obtained so that multiple signals over time can be retrieved. Depending on the diameter of the corrosion with respect to the diameter of the ultrasound beam one of the two signals can be larger or smaller. It may also be possible that a weaker signal is retrieved as a result of a bad reflection (reflection in every direction). As a result of this, the signal from the first surface may not have the highest amplitude.

The candidate SO event can be the event which has the peak with the highest amplitude. If this is also the first event, this is currently selected as the SO event. If it is not the first event, the event with the maximum amplitude before the candidate SO event is checked and it is checked if it has significant amplitude (e.g. more than 40% of candidate SO event amplitude) and if the distance between the candidate SO event and current event is approximately equal to the neighboring WT (e.g. within 20%). If both conditions are true, then the WT event actually has a higher amplitude than the SO event, and the current (earlier) event can be picked as SO.

The SO pulse can be the collection of peaks or index-amplitude pairs within an event that is close to the maximum. Optionally, only a number of index-amplitude pairs of the SO pulse in the center are selected. In this way, redundancy can be reduced by excluding low amplitude peaks in the remainder of the event.

Further, the accuracy can be improved by excluding possible larger amplitude peaks later within the same event. In an example, maximum 6 index-amplitude pairs in the center are selected. This may be done in different ways. In an example, the index-amplitude pair with minimum (negative) amplitude before or after the maximum SO can be selected, and one or more two additional index-amplitude pairs on both sides can be selected as well. Preferably, the selected index-amplitude pairs on both sides of the index-amplitude with the minimum (negative) amplitude can be selected such that the signal remains symmetric.

Optionally, picking of the stand-off further includes determining a precise SO based on a weighted average of the indices of the SO pulse, wherein a weight is based on an absolute value of an amplitude. The surface where the signal is reflected may not necessarily correspond with a maximum or highest amplitude.
However a higher amplitude may result in a higher weighting factor in the weighted averaging.

Optionally, determining an event center of remaining events includes using the shape of the determined SO pulse and apply a correlation function between event and determined SO pulse. The cross correlation function basically calculates the integral of the product of two functions, as a function of the shift of one function with respect to the other. When this integral is maximum, they align best. By using cross-correlation it is possible to look for events which correlate with the SO event.

Optionally, determining an event center of remaining events includes: eliminating one or more events for further analysis; calculating for the remaining events a cross correlation between the remaining event and the SO event; and determining a precise event center of the event. The shape of the SO event should also apply to the other wall. There are multiple ways to calculate a cross correlation, and many of them operate in the frequency-domain. In an example, evenly spaced time instances are assumed (approximation) and the only amplitudes are used in the calculations. Alternatively or additionally, instead of the full size cross correlation function only a part of the cross correlation function is used, wherein more than half of the length of the signal is overlapping. Due to the short size of the signal arrays, this may save a significant amount of calculation cycles.

Optionally, the cross correlation is a negative correlation.

The resulting correlation function can be used to find the resulting event centers for the found events later than the SO event. For the correlation between the SO event and later events the phase (positive or negative value) of the signals must be taken into account, i.e. the WT events are 180° phase shifted compared to the SO event, in other words if the highest amplitude in the SO event is positive then the highest amplitude in a WT event is negative.

Optionally, eliminating events for further processing comprises omitting peaks belonging to one or more events before the SO event, and omitting peaks belonging to one or more events for which at least one peak is beyond P times the SO event. As the SO event is determined, the remaining events may need to be still determined. Certain events may be unimportant for further analysis, so that they may be omitted for further analysis.

Optionally, P is in the range between 1.5 to 2, preferably 1.8. The signal of the SO event may repeat itself in time, like a repetition echo. The signal emitted by the at least one first ultrasonic transducer is received by the inner surface but is also reflected. In principle, this will occur exactly at 2 times the SO event. As the wall thickness is relatively small for a pipe, peaks belonging to one or more events for which at least one peak is beyond for example P=1.8 (margin) times the SO event can be omitted because chances are that these are a result of a repetition echo for the SO event.

Optionally, a wall thickness is determined using a plurality of events. In this way, a combination of events rather than an actual event can be used to determine the wall thickness. For this, the event centers, event amplitudes and SO of current pixel can be used. Optionally, the calculated neighboring WT are used (neighboring pixels).

Generally, the amplitudes of the WT signal and repetition echoes thereof will become weaker over time. However, under certain circumstances, for example due to corrosion or other phenomenon, a second WT (i.e. repetition echo) may have a larger amplitude compared to the first WT signal. In some cases, a false signal may be interpreted as the wall thickness. Thus it follows that signals similar to an event may be present but are not necessarily relevant for the wall thickness. This can be avoided by determining multiple repetition signals of the wall thickness and determining which wall thickness signals are most reliable. This may make the measurement more robust since also in difficult situations (e.g. signal in a tail) still meaningful information may be extracted.

Optionally, determining the WT includes: preprocessing the event centers, wherein the preprocessing of the event centers includes: calculating the event centers of the WT reflections with respect to the SO event center, and dismissing all events with an event center smaller than a threshold value so as to eliminate separate events in a tail of the SO event; and calculating the wall thickness of the object by determining the distance between SO and WT. The wall thickness can be determined based on the distance between the SO signal and the WT signal. If the wall thickness is small, for example as a result of corrosion, the WT signal may be closer to the SO signal. In some cases, if the wall thickness is small, the WT signal may become a part of the SO signal and for example be located in the tail of the SO signal. Then both signals are present, but they can not be distinguished from each other. This can be resolved by discarding peaks in a tail of the SO event.

Optionally, a plurality of WT events is used for calculating the wall thickness, wherein outliers are dismissed. The accuracy can be improved by selecting a most commonly obtained value of the wall thickness instead of an average value. In this way, outliers can be dismissed. The determination of the wall thickness can be improved by determining and taking into account repetition echoes of the wall thickness.

Calculation of the wall thickness may thus depend on the number of candidate WT events remaining. For example, for one event it can be checked if the event is accidently only the double event corresponding to twice the WT value; for two events, the difference can be taken as the WT, unless it yields a very different WT, then a first event can be taken. With three or more WT candidate events, another approach for combining the events is possible. Many possibilities are envisaged.

Optionally, the pig comprises a processing unit arranged for performing automatic event-picking. The results of the automatic event picking in the pig can for example be communicatively transferred to a computer for presentation and/or further analysis by an ultrasonist. The transfer may be performed wirelessly or through a wired connection.

The automatic event picker can perform the event picking much faster than a human operator such as an ultrasonist. Additionally, the automatic event picker can be checked/verified by an ultrasonist and the results of automatic event picking can be presented to the ultrasonist so that a better picture of the measurement results can be obtained.

Optionally, information about the stored peaks and associated information on the moment on which these peaks occur are transferred to a storage location accessible by a computer, wherein automatic event-picking is performed off-line by means of the computer which is separated from the pig. The measurement information comprising the receiving signal is gathered in the pig, wherein when the pig is pulled out of the pipeline, the information can be read and then analyzed by the computer for performing an automatic event-picking.

Optionally, compression of the receiving signal and storage thereof is performed while one or more ultrasonic measurements are performed. The data compression of the receiving signal and storage of the compressed receiving signal can be performed in real-time, while the ultrasonic measurements are performed, without delaying the measurement process.

Optionally, the compressed receiving signal is displayed in at least one of an A-scan display or a B-scan display.

Optionally, the compressed receiving signal is processed prior to displaying.

Optionally, the compressed receiving signal is at least rectified during said processing prior to displaying. For example, the compressed receiving signal can be rectified prior to displaying in a B-scan.

Optionally, the events picked by automatic event picking are marked in at least one of an A-scan or B-scan display of the receiving signal.

The invention further relates to a system for determining a wall thickness by means of ultrasound, the system comprising a pig comprising at least one first ultrasonic transducer attached to the pig arranged for transmitting an ultrasound in an object wherefrom the wall thickness has to be determined, at least one second ultrasonic transducer arranged for generating a receiving signal representing reflections of the ultrasound on the object received by the at least one second transducer, and a processor arranged for processing signals so as to obtain a compressed receiving signal. The pig is arranged for storing the compressed receiving signal in a storing device provided at the pig, wherein, in use, the processor is arranged for determining in the signal maximal N peaks having the largest amplitudes and associated information on the moment on which these peaks occur within the receiving signal and wherein the pig is arranged for storing information about the maximal N peaks and associated information on the moment on which these peaks occur in the storing device.

Optionally, the system further comprises a computer, wherein the pig is arranged to be communicatively connected with the computer for transferring the compressed receiving signal, wherein the computer is arranged for performing automatic event-picking.

The invention further relates to a computer program product for determining a wall thickness by means of ultrasound upon use of a pig, which computer program product comprises instructions for causing a processor to perform the steps of: sending a signal for transmitting by means of at least one first ultrasonic transducer which is attached to the pig ultrasound in an object wherefrom the wall thickness has to be determined; sending a signal for generating by means of at least one second ultrasonic transducer a receiving signal representing reflections of the ultrasound on the object received by the at least one second transducer; sending a signal for processing the received signals by means of the processor provided at the pig so as to obtain a compressed receiving signal; sending a signal for storing the compressed receiving signal in a storing device provided at the pig; sending a signal for determining by means of the processor in the signal maximal N peaks having the largest amplitude and associated information on the moment on which these peaks occur within the receiving signal; sending a signal for storing information about the maximal N peaks and associated information on the moment on which these peaks occur in the storing device.

The invention further relates to a pig comprising means for carrying out the method according to the current invention.

The invention has been elucidated with respect to an object such as a pipeline. However, the method and system can also be used for ultrasonic thickness measurements in general, especially when data compression is advantageous.

It will be appreciated that any of the aspects, features and options described in view of the pig apply equally to the described system and method, and vice versa. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the Drawing.

DETAILED DESCRIPTION

Figure 1:
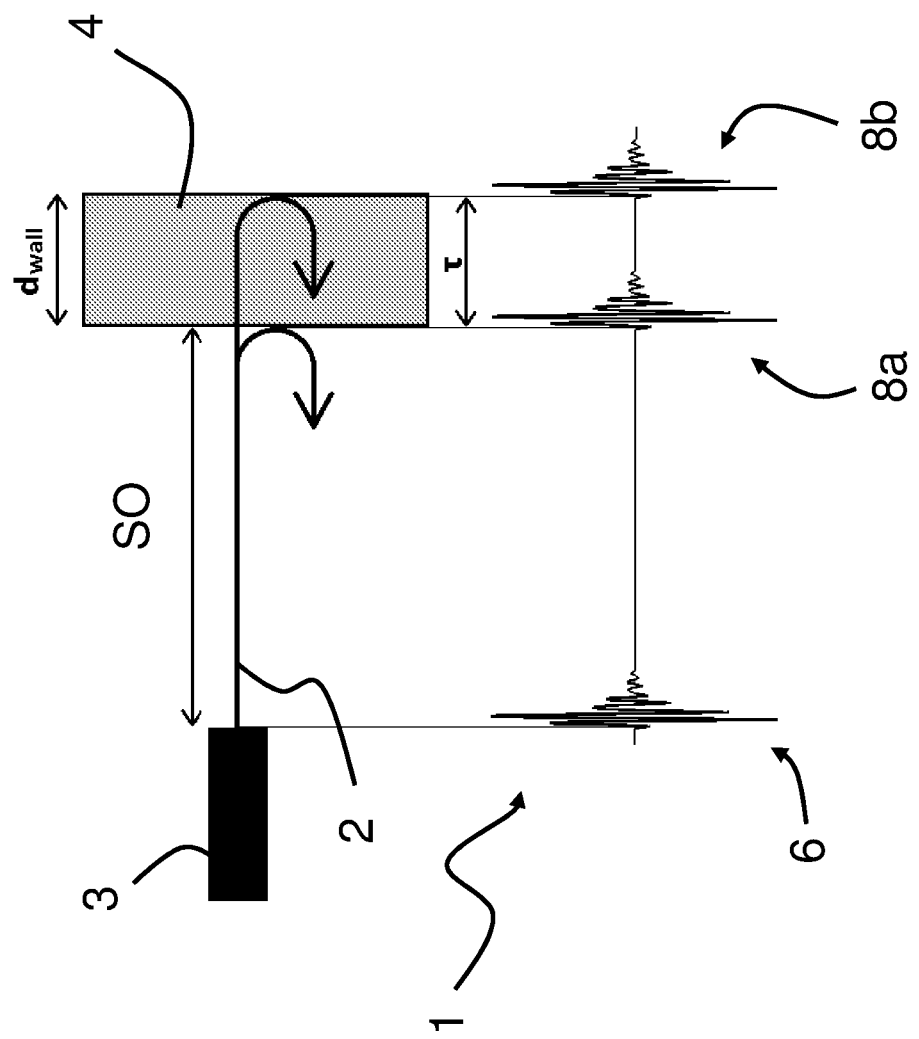
FIG. 1 shows an example of an ultrasound wall thickness measurement.

FIG. 1 shows a simplified schematic representation of a wall thickness $d_{wall}$ measurement using ultrasound. An A-scan 1 is shown at the bottom of FIG. 1. The A-scan 1 gives a time signal of an ultrasonic measurement, showing a signal amplitude (vertical axis) in function of time (horizontal axis). The ultrasound 2 emitted by the transducer 3 will encounter an inner diameter (ID) of the pipe 4 and be reflected back towards the transducer 3, indicating an inside surface of the pipe 4. A part of the ultrasound will reach an outer diameter (OD) of the pipe 4 and be reflected back towards the transducer 3, indicating the outside surface of the pipe 4. The distance between the probe 4 and the first interface (fluid-pipe wall) is called a stand-off (SO). A plurality of OD echoes can be available at substantially equal distances from each other, depending on the situation. An interface echo typically has multiple peaks of different amplitudes, wherein the pattern substantially corresponds to the transmitted pulse. In this embodiment, the first transducer 3 and the second transducer 3 are the same. However, it is also possible to use a plurality of transducers 3. The receiving signal obtained by means of the transducer 3 comprises a send pulse 6, an ID echo 8a and an OD echo 8b. Thus it follows that an ID echo 8a and an OD echo 8b are events.

The ID echo 8a and OD echo 8b have a time gap of T therebetween. The ultrasonic transducer can be arranged on a pig. The pig can be used so as to determine the wall thickness by means of ultrasound. The receiving signal generated by the transducer 3 represents reflections of the ultrasound on the object or pipeline 4.

The received signals 1 are processed by means of a processor provided at the pig to obtain a compressed receiving signal, wherein the compressed receiving signal is stored in a storing device provided at the pig. The processor determines in the signal maximal N peaks having the largest amplitudes and associated information on the moment on which these peaks occur within the receiving signal and wherein information about the maximal N peaks and associated information on the moment on which these peaks occur is stored in the storing device. Thus it follows that N is a predetermined number.

When the compressed receiving signals for one or more measurements are stored on the pig, this information can be transferred to a computer for analyzing the compressed receiving signals offline by performing event picking.

The event picking can be carried out automatically. In an example, the automatic event picking is carried out by electronics arranged in the pig itself, or online through a communication connection to a computer. In such cases, advantageously, the file size of the receiving signal can be reduced while keeping relevant information required for accurate event picking.

Figure 2:
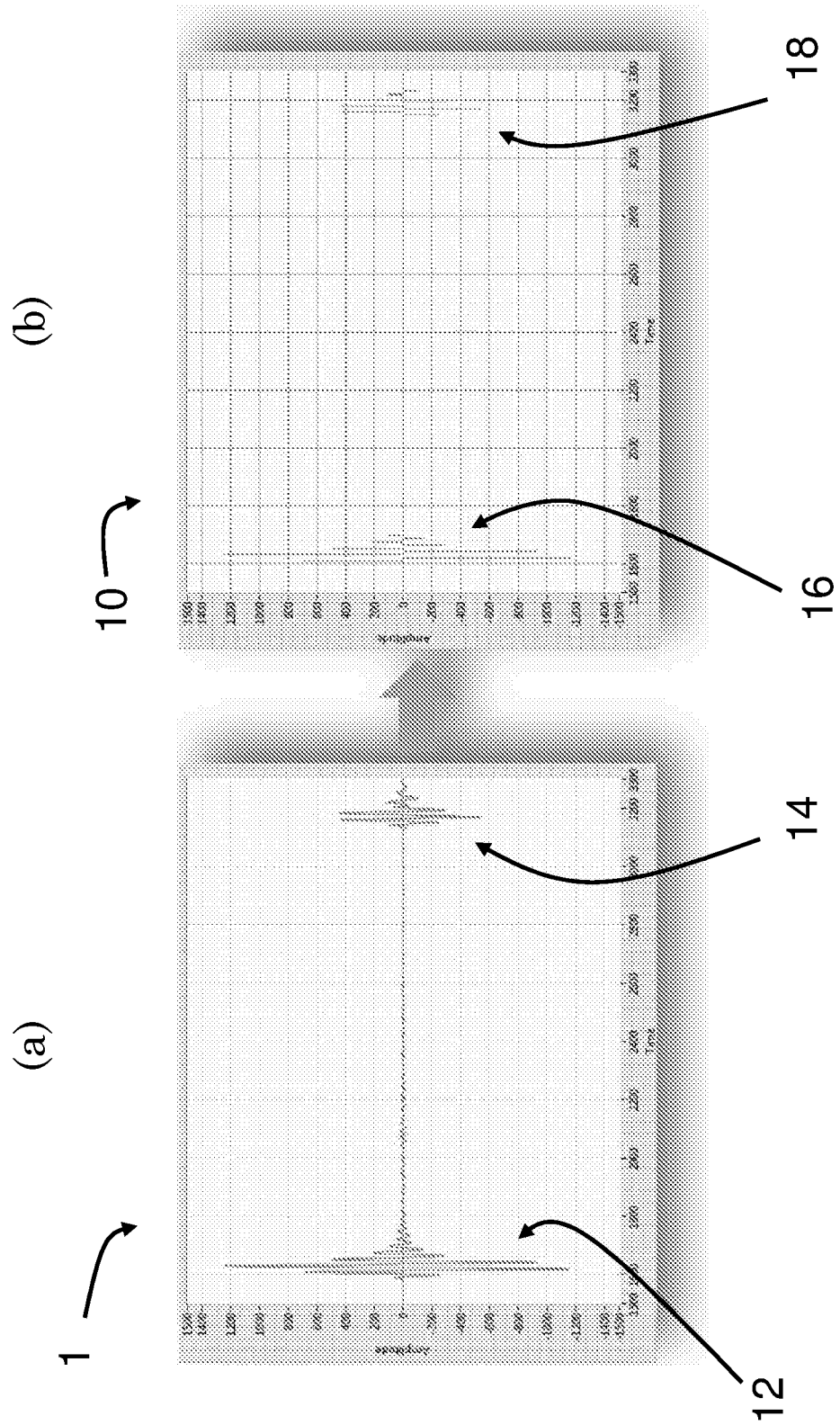
FIG. 2 shows compression of a receiving signal.

FIG. 2 shows data compression of an original A-scan 1 (receiving signal) to a compressed A-scan 10 (compressed receiving signal). The ultrasonic receiving signal 1 is digitized at a sampling frequency that is sufficiently high so as to avoid discarding relevant information (cf. Nyquist theorem). In this example, the receiving signals of 5 MHz transducers are sampled at a sampling frequency of 50 MHz, resulting in approximately 10 measured points per sine-shaped wave (including one period with a positive and negative portion). FIG. 2a shows the plot of the original A-scan 1 sampled at a frequency of 50 MHz. A compression is obtained by converting the original A-scan 1 to a reduced data set with maximum N peaks, i.e. compressed A-scan 10. The receiving signal 1 shown in FIG. 2a comprises two distinct events 12 and 14. Only for a limited number of peaks 16, 18 that correspond to the local extremes, the amplitude is stored, as can be seen in FIG. 2b. In this process, both positive maximum or negative minimum values are taken into account. A rectification of the peaks is therefore not required. In the shown embodiment, a maximum of 32 positions are selected (i.e. N is equal to 32). This results in a limited number of position-amplitude or index-amplitude pairs, namely 32 or less peaks. The obtained compressed receiving signal 10 comprises two distinct events 16, 18 each comprising a plurality of positive and negative peaks or index-amplitude pairs. Optionally, noise can be reduced by discarding values lower than a noise threshold. The reduced data set of the compressed receiving signal 10 comprises all the relevant information. Optionally, from the compressed A-scan 10 or compressed receiving signal 10, a time signal can be reconstructed, especially if the main frequency of the original A-scan 1 is known. Then, the reconstructed signal can be evaluated just like an original A-scan (time) signal. However, according to the method, a reconstruction is not needed since the compressed receiving signal 10 comprises all the relevant information and can be used directly for evaluation and event-picking.

The data compression and data storage can be performed while the ultrasonic measurements are performed, so that the measurements process is not delayed or at least the delay can be reduced. In an embodiment, a plurality of ultrasonic transducers (e.g. 160 5 MHz probes) is used for covering a complete circumference of the investigated pipeline from the inside. Higher or lower number of ultrasonic transducers can be employed depending on the requirements of the set-up, characteristics of the used pig, the quality of the measurements, the size of the pipe, etc. A measurement can be performed for each transducer for every axial movement (e.g. every 5 mm) of the pig, while the pig is moved at a speed within the pipe (e.g. 0.5 meter per second). Other axial movement and speeds can also be used.

In the shown embodiment, the A-scan is performed with digitization at 50 MHz. Compression of the receiving signal 1 or A-scan 1 is performed using the highest N peaks in the signal, e.g. using a three-point local extreme or maximum values between zero-crossings method. Other methods can be employed. In this example N is equal to 32 but other N values can also be used. The compressed receiving signal 10 (i.e. compressed A-scan 10) linked to the coordinates of the measurement position is then stored. This can be followed by an evaluation such as an event-picking, which can be performed online or offline. Combinations are also envisaged, wherein a part of the evaluation is performed online and a part offline. Furthermore, the pig may comprise means for performing the evaluation by itself, without the need of an external device such as a computer.

In case of offline evaluation, the compressed A-scans are transferred from the pig to a computer. The compressed A-scans can then be processed into the stand-off (SO) distance, stand-off amplitude and a wall thickness distance, using an automatic event-picker. Other features can also be processed, such as for example the amplitude of wall thickness. Reconstruction and/or decompression is not required and therefore not performed. The automatic event-picker employs a correlation function for finding a position of an event, wherein the position of the event does not necessarily have to coincide with one of the positions in the compressed receiving signal. For finding the position of the ID event in the ID echo a weighted average of the indices of the SO pulse is used, wherein a weight is based on an absolute value of an amplitude. The ID echo signal can be used for finding the positions of the OD events by applying a correlation. For the OD echoes a negative correlation is used because the OD echoes have a phase opposite to the ID echo. The automatic event-picking can be configured for taking multiples of the wall thickness into account, if available and usable. The outcome of an automatic event-picking can be visualized in known ways such as displays showing a color map of SO and WT.

In case of disturbed, weak or missing signals the results of adjacent pixels may be taken into account during the automatic event-picking. The selected position of SO and WT can then be verified by the operator in the display of the compressed A-scan.

Additionally or alternatively, events in the compressed receiving signal or compressed A-scan can be picked by an operator such as an ultrasonist, instead of using a complete receiving signal or A-scan.

Figure 3:
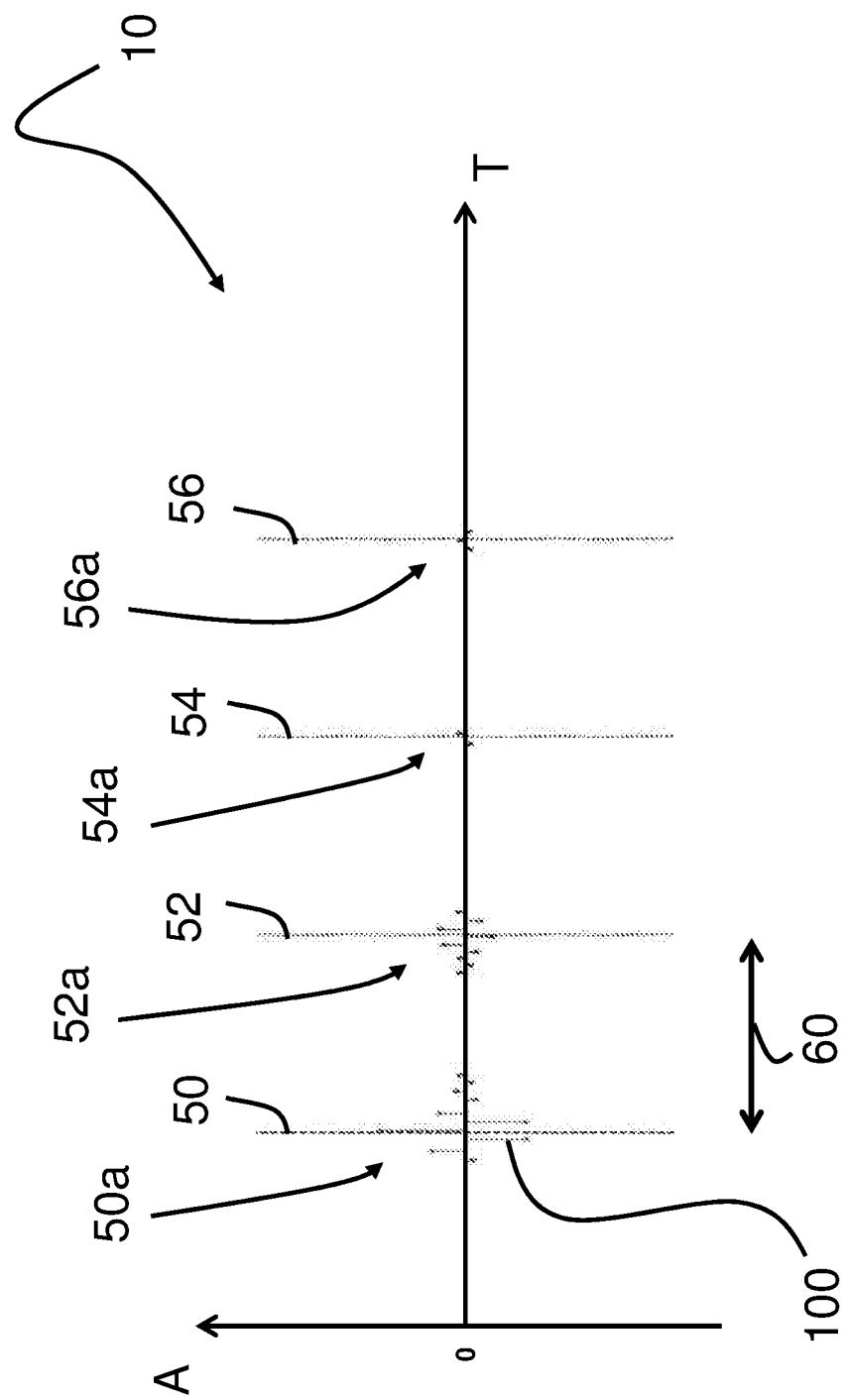
FIG. 3 shows event-picking in a compressed receiving signal.

FIG. 3 shows different events which are visualized in the compressed receiving signal. The compressed receiving signal or compressed A-scan provides compressed ultrasonic time signals. The at least one first and second transducers may be arranged on a pig, wherein the first and second transducers may be the same. The information received by the at least one second transducer, i.e. the receiving signal, can be compressed and stored as the compressed receiving signal in the pig, wherein the compression of the receiving signal is obtained by selecting for each A-scan a maximum predetermined number of peaks, which peaks may be positive and negative, and storing said peaks on the pig. The predetermined number of peaks can for example be 16, 32, 64. Other numbers are also possible. In this example a maximum number of 32 peaks are chosen from the receiving signal so as to obtain the compressed receiving signal. Further, the selected peaks in the compressed receiving signal are only selected when the peaks exceed a certain threshold value. Other criteria can also be employed so as to improve the quality of the compression of the receiving signal.

The compressed receiving signal is collected by the pig and stored therein, wherein an A-scan compression is carried out such as to obtain a compressed receiving signal. The information can then be read out and subsequently analyzed by an automatic event picker for performing automatic event picking.

The horizontal axis of the plot in FIG. 3 indicates time T (e.g. time index multiplied by sample frequency) and vertical axis indicates amplitude A. A distance on the horizontal axis can be used to calculate a distance, by multiplication with the sound speed. Multiple back wall reflections are used for determining the wall thickness in the compressed receiving signal. The peaks are grouped. The echoes in the compressed receiving signal are marked by the automatic event-picker, including an ID echo position 50a, first OD echo position 52a, multiple OD echoes 54a and 56a, each marked with a dashed line, respectively, line 50, line 52, line 54, line 56. Line 50 marks the SO and line 52 marks the WT. Thus it follows that the positions of the events are marked with a (dashed) line. From the distance 60 between line 50 and line 52, the wall thickness can be determined. The compressed receiving signal comprises a total of 24 peaks, with N=32. The SO is formed by the first group comprising a plurality of peaks 100. The SO signal and the WT signal typically have opposite phase with respect to each other.

Each peak or index-amplitude pair of the compressed A-scan is visualized separately, wherein the amplitude is indicated by a point. The index-amplitude pairs in a same event can be grouped (e.g. also displayed with a same color), such as to be able to easily distinguish different events from each other. The WT and WT multiples are indicated taking into account that a WT position corresponds to SO+n·WT, wherein n is a positive integer number.

Advantageously, an operator can quickly visually check the performance of the automatic event-picking, i.e. check whether the lines indicating stand-off and wall thickness are positioned at event groups and no signals are missed by the automatic event-picker. In an example, different settings or algorithms for the automatic event-picker can be tested and optimized, if necessary.

An advantage of the compression is that on the basis of an image, in the form of an amplitude-time diagram, of the amplitudes stored in the pig and supplemented with generated events by the automatic event picker, an expert such as an ultrasonist can visually judge the quality of the results of the automatic event picker. Additionally, the ultrasonist can perform the event picking himself on the basis of an image of the stored amplitudes in the amplitude-time diagram.

Advantageously, a measurement result can be used to improve the evaluation of adjacent measurements.

Furthermore, additionally, the ID position can be used to determine a correction in case the pig was positioned off-center relative to the pipe cross-section.

The visualization illustrated in FIG. 3 shows a compressed receiving signal 10 containing all relevant information. Therefore, this data can be used for constructing other displays. This may be displays which are used for conventional A-scan data, for example a B-scan display or C-scan display. For example, the compressed data can be rectified and an envelope can be constructed for the data to be displayed in B-scan.

Figure 4:
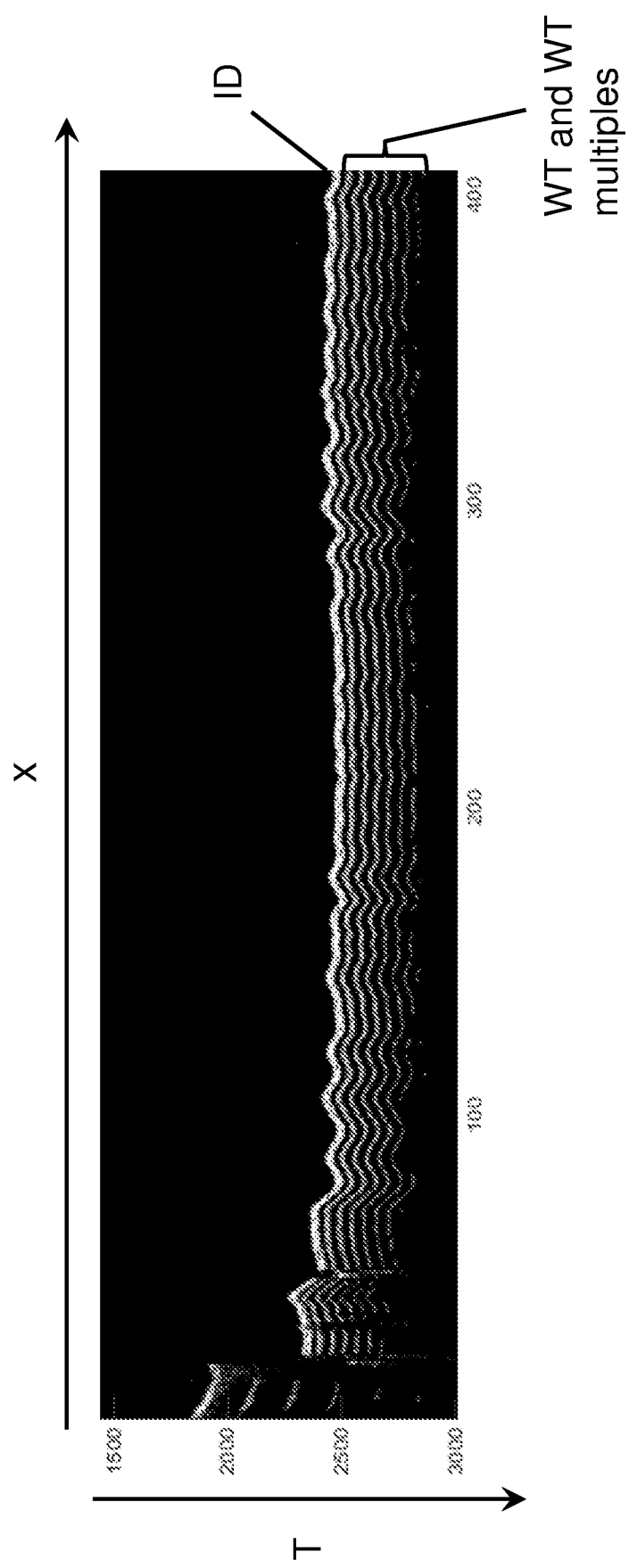
FIG. 4 shows a B-scan display.

FIG. 4 shows a B-scan display, wherein the horizontal axis represents a position x in an axial or a circumferential direction, and vertical axis represents time T (with a positive direction from top to bottom). A plurality of lines relating to the ID, WT and WT multiples is shown in the B-scan display. The intensity of the plotted lines is representative for the amplitude. Optionally, events found by the event picker can be marked by lines or dots in the B-scan display, which may support an ultrasonist in verification of the results obtained by automatic event picking in a fast and user friendly manner. For example, the selected events can be displayed in a C-scan display showing a mapping of the pipe wall in both axial and circumferential direction with a color or intensity to represent the measured value of SO or WT. Typically an indicator such as a cross hair cursor is used in the C-scan display to indicate the selected measurement position for which the data is also shown in A-scan or B-scan. In an example, the various displays are shown together to present the ultrasonist with an overview and to compare the various displays. In this way, measurement results at adjacent positions can be easily compared.

It will be appreciated that the method may include computer implemented steps. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

The pig may be arranged to communicate using wireless systems, wired systems, or a combination of both. When implemented as a wired system, the system may include components and interfaces suitable for communicating or wired communications media, such as input/output (I/O) adapters, physical connectors to connect the I/O adapter with a corresponding wired communications medium. When implemented as a wireless system, the system may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. A wireless communication device may be included in order to transmit and receive signals using various suitable wireless communications techniques. Such techniques may involve communications across one or more wireless networks.

Exemplary wireless networks include, but are not limited to, cellular networks, wireless local area networks (WLANs, cfr. WiFi, LiFi), wireless personal area networks (WPANs), wireless metropolitan area network (WMANs), satellite networks, et cetera. In communicating across such networks, the transmitter may operate in accordance with one or more applicable standards in any version.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for determining a wall thickness by use of ultrasound by a pig wherein the ultrasound is transmitted by at least one first ultrasonic transducer attached to the pig, wherein the ultrasound is transmitted in an object wherefrom the wall thickness has to be determined, wherein by use of at least one second ultrasonic transducer, a receiving signal is generated representing reflections of the ultrasound on the object received by the at least one second transducer, wherein a processor provided at the pig performs a data compression operation on the receiving signal to obtain a data compressed receiving signal, wherein the data compressed receiving signal is stored in a storing device provided at the pig, wherein, during the data compression operation, the processor determines in the receiving signal a maximal N peaks having largest absolute amplitudes and associated information on a moment on which each one of the maximal N peaks occurs within the receiving signal, wherein N is a predetermined number larger than 1, wherein the determined maximal N peaks include positive peaks and negative peaks, wherein, during the data compression operation, the processor determines a single position-amplitude pair or index-amplitude pair for each of the determined maximal N peaks based on the determined maximal N peaks and the determined associated information on the moment on which each one of the maximal N peaks occurs, resulting in a set of maximal N position-amplitude pairs or index-amplitude pairs of which the amplitudes include positive amplitudes and negative amplitudes, wherein the set of maximal N position-amplitude pairs or index-amplitude pairs is stored as the data compressed receiving signal in the storing device, and wherein an automatic event-picking is performed on the data compressed receiving signal to determine time positions of different signals of object wall interfaces.

2. The method according to claim 1, wherein N is in a range from 10 to 100.

3. The method according to claim 1, wherein N is one of the group consisting of: 16, 32, 64, and 128.

4. The method according to claim 1, wherein the maximal N peaks are stored if the amplitude of each of the maximal N peaks is larger than a first threshold value, and wherein a quantity M, where M<N, peaks are stored instead of the N peak if the receiving signal only comprises M peaks having an amplitude that is larger than the first threshold.

5. The method according to claim 1, wherein more than one peak per interface is stored.

6. The method according to claim 1, wherein the first ultrasonic transducer and the second ultrasonic transducer are the same.

7. The method according to claim 1, wherein the pig comprises a plurality of the first and/or the second transducers.

8. The method according to claim 1, wherein the pig is moved axially inside a pipe filled with a fluid for measuring the wall thickness along a pipe circumference over a first length of the pipe, wherein the measured wall thickness is the wall thickness of the pipe, and wherein a plurality of measurements are carried out within the first length of the pipe.

9. The method according to claim 1, wherein the automatic event-picking comprises:
picking of a stand-off (SO), wherein an event is searched that corresponds to a nearest wall; and
determining an event center of remaining events; and
picking of a wall thickness (WT).

10. The method according to claim 9, wherein a pre-processing of the data compressed receiving signal is performed prior to the picking of the stand-off (SO).

11. The method according to claim 10, wherein during the pre-processing, the maximal N peaks of the data compressed receiving signal are ordered in a time of flight index sequence.

12. The method according to claim 11, wherein during the pre-processing, the peaks are grouped in an event group, wherein the peaks are grouped belonging to a same event group when consecutive indices of the time of flight index sequence are located close to each other.

13. The method according to claim 12, wherein the peaks are grouped belonging to a same event group when consecutive indices of the time of flight index sequence are separated by less than approximately three quarter of a wavelength.

14. The method according to claim 9, wherein the picking of the stand-off includes at least one of the group consisting of:
determining a candidate SO event as the event having the peak with a highest amplitude in the data compressed receiving signal, and selecting the candidate SO event as the SO event if the peak with the highest amplitude belongs to a first event group; and
selecting an earlier event with a maximum amplitude before the candidate SO event as the SO event if:
the earlier event with a maximum amplitude has an amplitude of more than 30%-50% of the candidate SO event amplitude, and
a distance between the candidate SO event and the earlier event is approximately equal to a neighboring wall thickness.

15. The method according to claim 14, wherein the picking of the stand-off further includes determining a precise SO based on a weighted average of indices of a time flight index sequence of a SO pulse, wherein a weight is based on an absolute value of an amplitude.

16. The method according to claim 9, wherein determining an event center of remaining events includes using a shape of a determined SO pulse and applying a correlation function between event and determined SO pulse.

17. The method according to claim 16, wherein the determining an event center of remaining events includes:
eliminating one or more events for further analysis;
calculating for the remaining events a cross correlation between the remaining event and the SO event; and
determining a precise event center of the event.

18. The method according to claim 17, wherein the cross correlation is a negative correlation.

19. The method according to claim 18, wherein the eliminating events for further processing comprises omitting peaks belonging to one or more events before the SO event, and omitting peaks belonging to one or more events for which at least one peak is beyond P times the SO event, P being a predetermined number larger than 0.

20. The method according to claim 19, wherein P is in a range between 1.5 to 2.

21. The method according to claim 1, wherein the wall thickness is determined using a plurality of events.

22. The method according to claim 21, wherein determining the wall thickness (WT) includes: preprocessing event centers, wherein the preprocessing the event centers includes:
calculating event centers of WT reflections with respect to a stand off SO event center, dismissing all events with an event center smaller than a threshold value so as to eliminate separate events in a tail of a stand off event; and
calculating the wall thickness of the object by determining a distance between SO and WT.

23. The method according to claim 1, wherein a plurality of WT events are used for calculating the wall thickness, wherein outliers are dismissed.

24. The method according to claim 1, wherein the pig comprises a processing unit arranged for performing automatic event-picking.

25. The method according to claim 1, wherein the stored information about the maximal N peaks and associated information on the moment on which each one of the maximal N peaks occurs are transferred to a storage location accessible by a computer, wherein automatic event-picking is performed off-line by the computer that is separated from the pig.

26. The method according to claim 1, wherein compression of the receiving signal and storage thereof is performed while one or more ultrasonic measurements are performed.

27. The method according to claim 1, wherein the data compressed receiving signal is displayed in at least one of an A-scan display or a B-scan display.

28. The method according to claim 27, wherein the data compressed receiving signal is processed prior to displaying.

29. The method according to claim 28, wherein the data compressed receiving signal is at least rectified during processing prior to displaying.

30. The method according to claim 1, wherein events picked by the automatic event picking are marked in at least one of an A-scan or B-scan display of the data compressed receiving signal.

31. The method according to claim 1, wherein N is a predetermined number.

32. The method according to claim 1, wherein peaks having positive and negative amplitudes are taken into account per event for determining the maximal N peaks in the data compressed receiving signal.

33. The method according to claim 1, wherein an event is at least one reflection of the ultrasound transmitted in the object wherefrom the wall thickness has to be determined, such as a reflection on an inner diameter (ID; inner surface) of the object or a reflection on an outer diameter (OD; outer surface) of the object.

34. A system for determining a wall thickness by ultrasound by a pig, the system comprising a pig comprising at least one first ultrasonic transducer attached to the pig arranged for transmitting an ultrasound in an object wherefrom the wall thickness has to be determined, at least one second ultrasonic transducer arranged for generating a receiving signal representing reflections of the ultrasound on the object received by the at least one second transducer, and a processor provided at the pig arranged for performing a data compression operation on the receiving signal to obtain a data compressed receiving signal, wherein the pig is arranged for storing the data compressed receiving signal in a storing device provided at the pig,
- wherein, during the data compression operation, the processor is arranged for determining, in the receiving signal, a maximal N peaks having largest absolute amplitudes and associated information on a moment on which each one of the maximal N peaks occurs within the receiving signal, wherein N is a predetermined number larger than 1, wherein the determined maximal N peaks include positive peaks and negative peaks,
- wherein, during the data compression operation, the processor determines a single position-amplitude pair or index-amplitude pair for each of the determined maximal N peaks based on the determined maximal N peaks and the determined associated information on the moment on which each one of the maximal N peaks occurs, resulting in a set of maximal N position-amplitude pairs or index-amplitude pairs of which the amplitudes include positive amplitudes and negative amplitudes,
- wherein the pig is arranged for storing the set of maximal N position-amplitude pairs or index-amplitude pairs as the data compressed receiving signal in the storing device, and
- wherein the system is arranged for performing an automatic event-picking on the data compressed receiving signal to determine time positions of different signals of object wall interfaces.

35. The system according to claim 34, further comprising a computer, wherein the pig is arranged to be communicatively connected with the computer for transferring the data compressed receiving signal, wherein the computer is arranged for performing the automatic event-picking.

36. A non-transitory computer-readable medium comprising computer-executable instructions for facilitating determining a wall thickness by analyzing ultrasound echo signals obtained by a pig, wherein the computer-executable instructions, when executed by a processor located at the pig, cause performing a method, at the pig, comprising:
- sending a signal for transmitting ultrasound by at least one first ultrasonic transducer that is attached to the pig in an object wherefrom the wall thickness has to be determined;
- sending a signal for generating by at least one second ultrasonic transducer a receiving signal representing reflections of the ultrasound on the object received by the at least one second transducer;
- performing a data compression operation on the receiving signal by the processor provided at the pig so as to obtain a data compressed receiving signal;
- sending a signal for storing the data compressed receiving signal in a storing device provided at the pig;
- wherein the data compression operation comprises:
    - determining in the receiving signal, a maximal N peaks having largest absolute amplitude and associated information on a moment on which each one of the maximal N peaks occurs within the receiving signal, wherein N is a predetermined number larger than 1, wherein the determined maximal N peaks include positive peaks and negative peaks; and
    - determining a single position-amplitude pair or index-amplitude pair for each of the determined maximal N peaks based on the determined maximal N peaks and the determined associated information on the moment on which each one of the maximal N peaks occurs, resulting in a set of maximal N position-amplitude pairs or index-amplitude pairs of which the amplitudes include positive amplitudes and negative amplitudes; and
- sending a signal for storing the set of maximal N position-amplitude pairs or index-amplitude pairs as the data compressed receiving signal stored in the storing device.

37. A pig comprising an ultrasound sensor, non-transitory computer-readable medium, and a processor, wherein the pig is configured to obtain ultrasound signals, and the processor is configured to execute instructions stored on the non-transitory computer-readable medium to carry out a method comprising:
- sending a signal for transmitting ultrasound by at least one first ultrasonic transducer that is attached to the pig in an object wherefrom the wall thickness has to be determined;
- sending a signal for generating by at least one second ultrasonic transducer a receiving signal representing reflections of the ultrasound on the object received by the at least one second transducer;
- performing a data compression operation on the receiving signal by the processor provided at the pig so as to obtain a data compressed receiving signal;
- sending a signal for storing the data compressed receiving signal in a storing device provided at the pig;
- wherein the data compression operation comprises:
    - determining in the receiving signal, a maximal N peaks having largest absolute amplitude and associated information on a moment on which each one of the maximal N peaks occurs within the receiving signal, wherein N is a predetermined number larger than 1, wherein the determined maximal N peaks include positive peaks and negative peaks; and
    - determining a single position-amplitude pair or index-amplitude pair for each of the determined maximal N peaks based on the determined maximal N peaks and the determined associated information on the moment on which each one of the maximal N peaks occurs, resulting in a set of maximal N position-amplitude pairs or index-amplitude pairs of which the amplitudes include positive amplitudes and negative amplitudes; and sending a signal for storing the set of maximal N position-amplitude pairs or index-amplitude pairs as the data compressed receiving signal stored in the storing device.

* * * * *